(12) United States Patent
Takano et al.

(10) Patent No.: US 6,574,976 B2
(45) Date of Patent: Jun. 10, 2003

(54) REFRIGERANT CYCLE SYSTEM AND VALVE DEVICE FOR THE SAME

(75) Inventors: Yoshiaki Takano, Kariya (JP); Ikuo Ochi, Kariya (JP); Yasuhiro Yamamoto, Kariya (JP); Noboru Takagi, Ogaki (JP); Tetsuo Hirose, Ogaki (JP)

(73) Assignees: Denso Corporation, Kariya (JP); Pacific Industrial Co., Ltd., Ogaki (JP)

( * ) Notice: Subject to any disclaimer, the term of this patent is extended or adjusted under 35 U.S.C. 154(b) by 166 days.

(21) Appl. No.: 09/927,611

(22) Filed: Aug. 10, 2001

(65) Prior Publication Data

US 2002/0020180 A1 Feb. 21, 2002

(30) Foreign Application Priority Data

Aug. 11, 2000 (JP) ........................ 2000-244614
May 24, 2001 (JP) ........................ 2001-156033

(51) Int. Cl.[7] .............................................. F25B 41/04
(52) U.S. Cl. ..................................... 62/196.4; 62/324.6
(58) Field of Search ....................... 62/159, 160, 196.1, 62/196.4, 324.1, 324.6

(56) References Cited

U.S. PATENT DOCUMENTS

| | | | |
|---|---|---|---|
| 5,291,941 A | 3/1994 | Enomoto et al. | 165/62 |
| 5,934,097 A * | 8/1999 | Karl | 62/324.6 X |
| 6,076,366 A | 6/2000 | Takano et al. | 62/196.4 |
| 6,125,643 A * | 10/2000 | Noda et al. | 62/324.6 X |
| 6,244,060 B1 * | 6/2001 | Takano et al. | 62/196.4 |
| 6,286,327 B1 * | 9/2001 | Karl | 62/196.4 |

FOREIGN PATENT DOCUMENTS

| | | | |
|---|---|---|---|
| EP | 0895884 A2 * | 2/1999 | |
| JP | 09109669 | * 4/1997 | |

* cited by examiner

Primary Examiner—Harry B. Tanner
(74) Attorney, Agent, or Firm—Harness, Dickey & Pierce, PLC (57) ABSTRACT

In a refrigerant cycle system having a hot gas heater function, a valve device includes a solenoid valve for opening and closing a communication between a compressor and a condenser, a differential pressure valve opened by a pressure difference between a discharge side of the compressor and an inlet side of the condenser when the solenoid valve is closed for directly introducing gas refrigerant from the discharge side of the compressor into an evaporator, and a check valve for preventing refrigerant discharged from the compressor from flowing into the condenser when the solenoid valve is opened. In the valve device, at least the three valves are integrated by a housing member to construct an integrated member.

16 Claims, 9 Drawing Sheets

| D | NOISE REDUCTION(dB) IN 6-10 kHz |
|---|---|
| NONE | 0 (REF.) |
| Φ3 | ~ −2 |
| Φ6 | ~ −5 |

REFRIGERANT CYCLE SYSTEM AND VALVE DEVICE FOR THE SAME

CROSS-REFERENCE TO RELATED APPLICATION

This application is related to and claims priority from Japanese Patent Applications No. 2000-244614 filed on Aug. 11, 2000, and No. 2001-156033 filed on May 24, 2001, the contents of which are hereby incorporated by reference.

BACKGROUND OF THE INVENTION

1. Field of the Invention

The present invention relates to a refrigerant cycle system having a hot-gas heater function using an evaporator as a radiator, and to a valve device used for the refrigerant cycle system. In the refrigerant cycle system, the hot-gas heater function is obtained by directly introducing gas refrigerant (hot gas) discharged from a compressor into the evaporator while bypassing a condenser.

2. Description of Related Art

Figure 12:
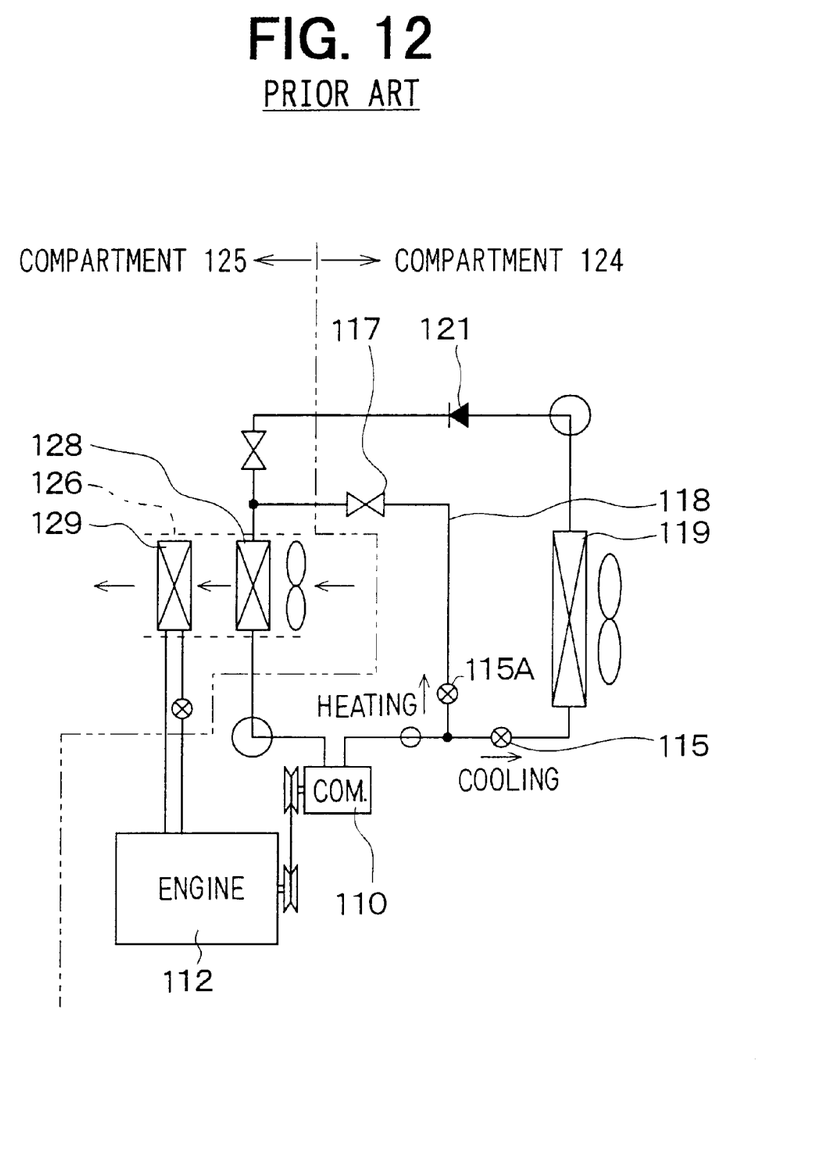
FIG. 12 is a schematic diagram showing a conventional refrigerant cycle system for a vehicle air conditioner.

U.S. Pat. No. 5,291,941 discloses a refrigerant cycle system having a heating function due to a hot-gas bypass. As shown in FIG. 12, a hot-gas bypass passage 118 is provided in this conventional system, and a heating decompression unit 117 and a heating solenoid valve 115A are provided in the hot-gas bypass passage 118. In addition, a cooling solenoid valve 115 is provided in a refrigerant passage through which refrigerant discharged from a compressor 110 flows into a condenser 119. Here, gas refrigerant discharged from the compressor 110 flows directly into an evaporator 128 through the hot-gas bypass passage 118 while bypassing the condenser 119 and the like. Further, the hot-gas bypass passage 118 and the refrigerant passage of the condenser 119 are selectively opened and closed by the cooling solenoid valve 115 and the heating solenoid valve 115A. Within an air-conditioning unit 126 disposed in a passenger compartment 125, a hot-water-type heating heater core 129 is disposed at a downstream air side of the evaporator 128. In a heating mode in winter, when a temperature of hot water circulating the heating heater core 129 is lower than a predetermined temperature, for example, when an engine 112 is started for warming up, high-temperature gas refrigerant (hot gas) discharged from the compressor 110 flows through the hot-gas bypass passage 118, and is directly introduced into the evaporator 128 after being decompressed by the heating decompression unit 117. Therefore, in the heating mode, heat is radiated from refrigerant to air in the evaporator 128, and the heating function for heating air can be obtained.

On the other hand, in a cooling mode, the high-temperature gas refrigerant discharged from the compressor 110 flows into the condenser 119 by closing the heating solenoid valve 115A and opening the cooling solenoid valve 115.

In the above-described system, however, both solenoid valves 115, 115A are used for switching refrigerant passages in the cooling mode and the heating mode. Further, a check valve 121 for preventing refrigerant in the hot-gas bypass passage 118 from flowing into the condenser 119 in the heating mode is provided separately from the solenoid valves 115, 115A. Accordingly, the number of components is increased, and production cost is increased in this system.

Further, a long piping is required for the hot-gas bypass passage 118 extending from an outlet of the heating solenoid valve 115A disposed around the compressor 110 in an engine compartment 124, to an inlet of the evaporator 128 in the passenger compartment 125. Therefore, mounting performance of the system on a vehicle is decreased.

SUMMARY OF THE INVENTION

In view of the foregoing problems, it is an object of the present invention to provide a refrigerant cycle system having a hot-gas heater function, which has a simple integrated structure of a valve device.

According to the present invention, in a refrigerant cycle system which switches an operation mode between a cooling mode where air is cooled by evaporating low-pressure refrigerant in an evaporator and a heating mode where air is heated in the evaporator by using gas refrigerant directly introduced from a compressor, a valve device includes a solenoid valve for opening and closing a refrigerant passage between a discharge side of the compressor and a condenser cooling and condensing refrigerant in the cooling mode, a differential pressure valve disposed to be opened by a pressure difference between the discharge side of the compressor and a side of the condenser, generated when the solenoid valve is closed, in such a manner that gas refrigerant discharged from the compressor is directly introduced into the evaporator when the differential pressure valve is opened, and a check valve disposed to prevent refrigerant at the discharge side of the compressor from flowing into the condenser when the differential pressure valve is opened. In the valve device, the solenoid valve, the differential pressure valve and the check valve are integrated by a housing member to construct an integrated structure. Accordingly, at least three kinds of valves, that is, the solenoid valve, the differential pressure valve and the check valve can be used as the integrated structure, thereby reducing an arrangement space of the valve device and the number of attachment steps. Further, the refrigerant cycle system operates by a combination of the one solenoid valve and the one differential pressure valve. Since the differential pressure valve can be made smaller, lighter and simpler than the solenoid valve in addition to the integration of three kinds of valves, the valve device can be produced in low cost while having a simple structure.

Furthermore, because the differential pressure valve is opened by the pressure difference between the discharge side of the compressor and the condenser, generated when the solenoid valve is closed, both the solenoid valve and the differential pressure valve are not closed at the same time. Therefore, it can prevent a refrigerant cycle circuit of the refrigerant cycle system from being closed when the compressor operates, and it can prevent the refrigerant cycle circuit from failing.

Preferably, in the valve device, the housing member is disposed to define a first refrigerant passage connected to the discharge side of the compressor, a second refrigerant passage connected to a refrigerant inlet side of the condenser, a third refrigerant passage connected to a refrigerant inlet side of the evaporator, and a fourth refrigerant passage connected to a refrigerant outlet side of the condenser. The solenoid valve is disposed to open and close a communication between the first and second refrigerant passages, and the differential pressure valve is disposed to open and close a communication between the first and third refrigerant passages. Further, the housing member is disposed to have therein a heating decompression means for decompressing gas refrigerant flowing from the first refrigerant passage to the third refrigerant passage when the differential pressure valve is opened, and to have therein a communication passage through which the fourth refrigerant passage communicates with a downstream refrigerant side of the heating decompression means. In addition, the check valve is provided in the communication passage. Accordingly, the fourth refrigerant passage connected to the outlet side of the condenser can communicate with the downstream refrigerant side of the heating decompression means through the communication passage in the housing member. That is, the downstream refrigerant side of the heating decompression means and the communication passage connected to the outlet side of the condenser can be joined to each other in the housing member. Therefore, it is possible to connect the third refrigerant passage of the housing member and the inlet side of the evaporator by only using a single low-pressure pipe.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
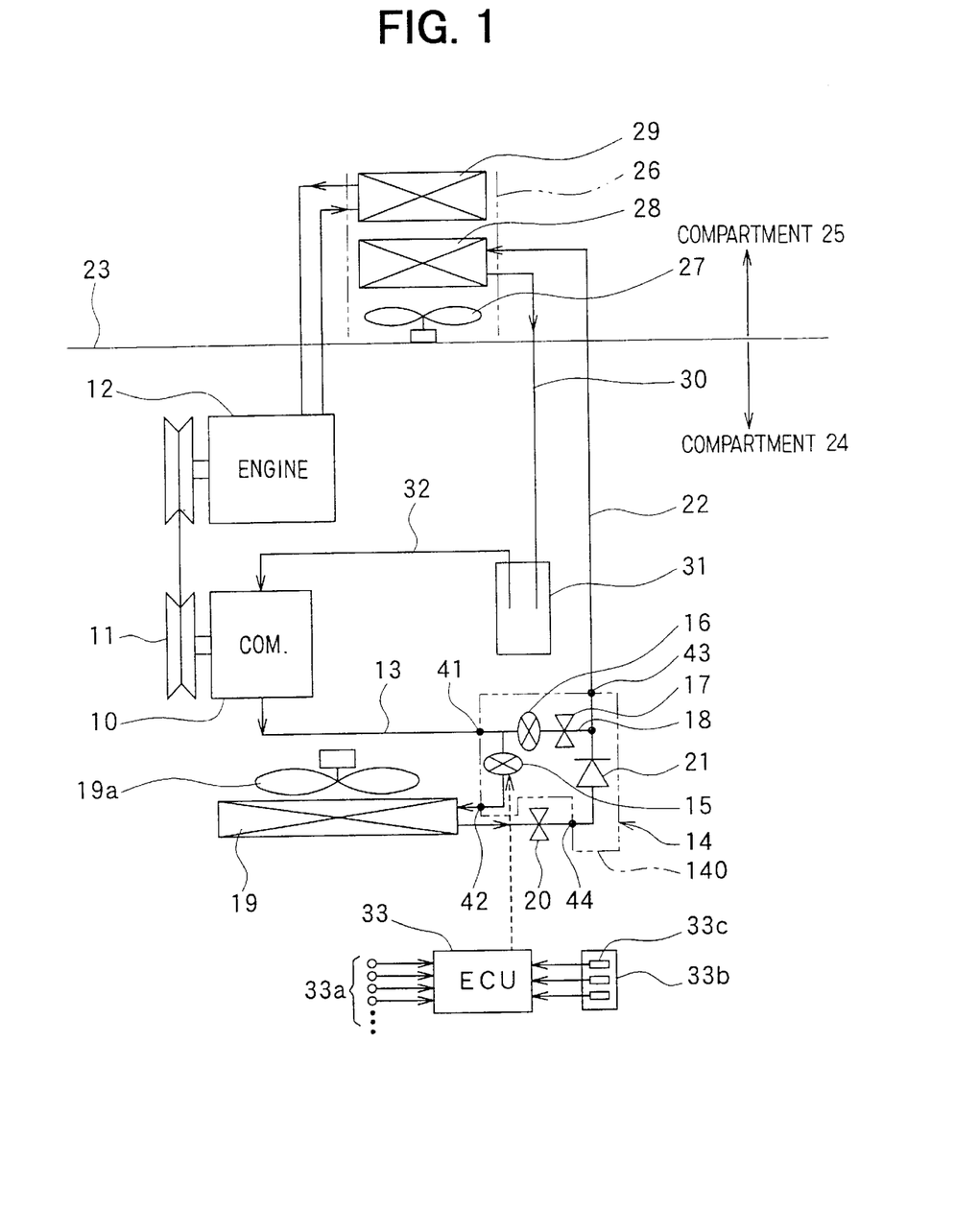
FIG. 1 is a schematic diagram showing a refrigerant cycle system for a vehicle air conditioner according to a first preferred embodiment of the present invention.

A first preferred embodiment of the present invention will be now described with reference to FIGS. 1–4. In the first embodiment, the present invention is typically applied to a refrigerant cycle system for a vehicle air conditioner. As shown in FIG. 1, a compressor 10 is driven by a vehicle engine 12 through an electromagnetic clutch 11, and a valve device 14 is provided in a discharge pipe 13 of the compressor 10.

The valve device 14 has an integrated structure in which a-pilot-type solenoid valve 15 for opening and closing a cooling refrigerant passage, a differential pressure valve 16 for opening and closing a heating refrigerant passage, a heating decompression unit 17 and a check valve 21 are integrated as one integrated member by a housing member 140. A hot-gas bypass passage 18 is provided in the valve device 14, and the differential pressure valve 16 and the heating decompression device 17 are provided in the hot-gas bypass passage 18.

The discharge pipe 13 of the compressor 10 is connected to a refrigerant inlet of a condenser 19 through the cooling solenoid valve 15 of the valve device 14, and a cooling decompression unit 20 is connected to a refrigerant outlet of the condenser 19. In the first embodiment, the cooling decompression unit 20 is a fixed restrictor (throttle). For example, a capillary tube having a predetermined length and a small inner diameter (e.g., $\phi$1.2–1.3 mm) can be used as the cooling decompression unit 20. In the condenser 19, refrigerant is cooled and condensed by outside air blown by an electrical cooling fan 19a.

The valve device 14 is attached and fixed to the condenser 19 at an arbitrary position such as an upper side plate of the condenser 19, using an attachment bracket (not shown), so that the condenser 19 and the valve device 14 can be integrated with each other before being mounted on a vehicle.

The check valve 21, which is a reverse-flow prevention unit for preventing refrigerant from flowing from the hot-gas bypass passage 18 to the side of the condenser 19 in a heating mode, is connected between an outlet side of the hot-gas bypass passage 18 (i.e., outlet side of heating decompression unit 17) and an outlet side of the cooling decompression unit 20. The outlet of the check valve 21 is connected to the outlet of the hot-gas bypass passage 18.

The hot-gas bypass passage 18 is an extremely short refrigerant passage extending from the inlet of the heating differential pressure valve 16 to the outlet of the heating decompression unit 17 within the valve device 14.

The outlet of the hot-gas bypass passage 18 and the outlet of the check valve 21 are joined to each other, and this joint portion is connected to a single low-pressure pipe 22 disposed at a refrigerant inlet side of an evaporator 28. This single low-pressure pipe 22 is extended from an engine compartment 24 into the passenger compartment 25 trough a hole provided in a dashboard 23. The dashboard 23 is disposed to partition the engine compartment 24 and the passenger compartment 25 from each other.

An air-conditioning unit 26 is disposed under an instrument panel (not shown) disposed at a most front side in the passenger compartment 25. In the air-conditioning unit 26, the evaporator 28 is disposed at a downstream air side of an air-conditioning electric blower 27, and a heating heater core 29 is disposed at a downstream air side of the evaporator 28.

The low-pressure pipe 22 is connected to a refrigerant inlet of the evaporator 28, and a low-pressure pipe 30 is connected to a refrigerant outlet of the evaporator 28. The low-pressure pipe 30 at the outlet side of the evaporator 28 extends into the engine compartment 24 while penetrating through the dashboard 23, and is connected to an inlet of an accumulator 31 within the engine compartment 24. An outlet of the accumulator 31 is connected to a suction port of the compressor 10 through a suction pipe 32.

The accumulator 31 separates refrigerant flowing therein into gas refrigerant and liquid refrigerant, and stores the liquid refrigerant therein. Further, the accumulator 31 is disposed, so that a part of the liquid refrigerant containing lubricating oil, stored in an accumulator tank around a bottom, is also sucked into the compressor 10 for returning lubricating oil to the compressor 10 while the gas refrigerant is sucked into the compressor 10.

In the air-conditioning unit 26, the evaporator 28 cools air (air inside or outside the passenger compartment), blown by the air-conditioning electric blower 27, by absorbing evaporation-latent heat of refrigerant from air in a cooling mode or in a dehumidifying mode. In a heating mode in winter, the evaporator 28 heats air by using high-temperature gas refrigerant flowing from the hot-gas bypass passage 18, and is used as a radiator.

Further, hot water (cooling water) of the vehicle engine 12 is circulated into the heating heater core 29 by a hot water pump driven by the engine 12, so that the heating heater core 29 heats air after passing through the evaporator 28 using the hot water as a heat source. Then, the conditioned air is blown into the passenger compartment 25 from plural air outlets provided at a downstream air side of the heating heater core 29.

The cooling solenoid valve 15 is controlled to be opened and closed by interrupting current supply thereto based on a control signal from an air-conditioning electronic control unit (ECU) 33. Further, operations of electric devices such as the electromagnetic clutch 11, the electric cooling fan 19a for blowing outside air toward the condenser 19 and the air-conditioning electric blower 27 are also controlled based on control signals from the air-conditioning electronic control unit 33. As well known, detection signals from a sensor group 33a for detecting vehicle environmental conditions, operation signals from operation members 33c of an air-conditioning operation panel 33b and the likes are input into the air-conditioning electronic control unit 33.

Next, a description will be made on a specific configuration of the valve device 14 with reference to FIGS. 2 and 3. The housing member 140 of the valve device 14 is made of a metal material such as aluminum, and is approximately formed into a rectangular parallelopiped shape. Further, the housing member 140 has first and second refrigerant passages 41, 42 at one end side thereof (e.g., at the right side in FIG. 2), and has third and fourth refrigerant passages 43, 44 at the other end side thereof (e.g., at the left side in FIG. 2).

The first refrigerant passage 41 is connected to the discharge side of the compressor 10, and the second refrigerant passage 42 is connected to the inlet side of the condenser 19. The third refrigerant passage 43 is connected to the inlet side of the evaporator 28, and the fourth refrigerant passage 44 is connected to the outlet side of the condenser 19 through the cooling decompression unit 20. These first to fourth refrigerant passages 41 to 44 are indicated by black points at the corresponding positions in FIG. 1, respectively.

The solenoid valve 15 is constructed as a pilot-type solenoid valve (electromagnetic valve) including a main valve body 46 and a supplementary valve body (pilot valve) 48. Here, the main valve body 46 is disposed to open and close a refrigerant passage 45 between the first refrigerant passage 41 (discharge side of the compressor 10) and the second refrigerant passage 42 (inlet side of the condenser 19). The supplementary valve body 48 is driven by an electromagnetic force of an electromagnetic coil 47 to displace the main valve body 46.

Figure 3:
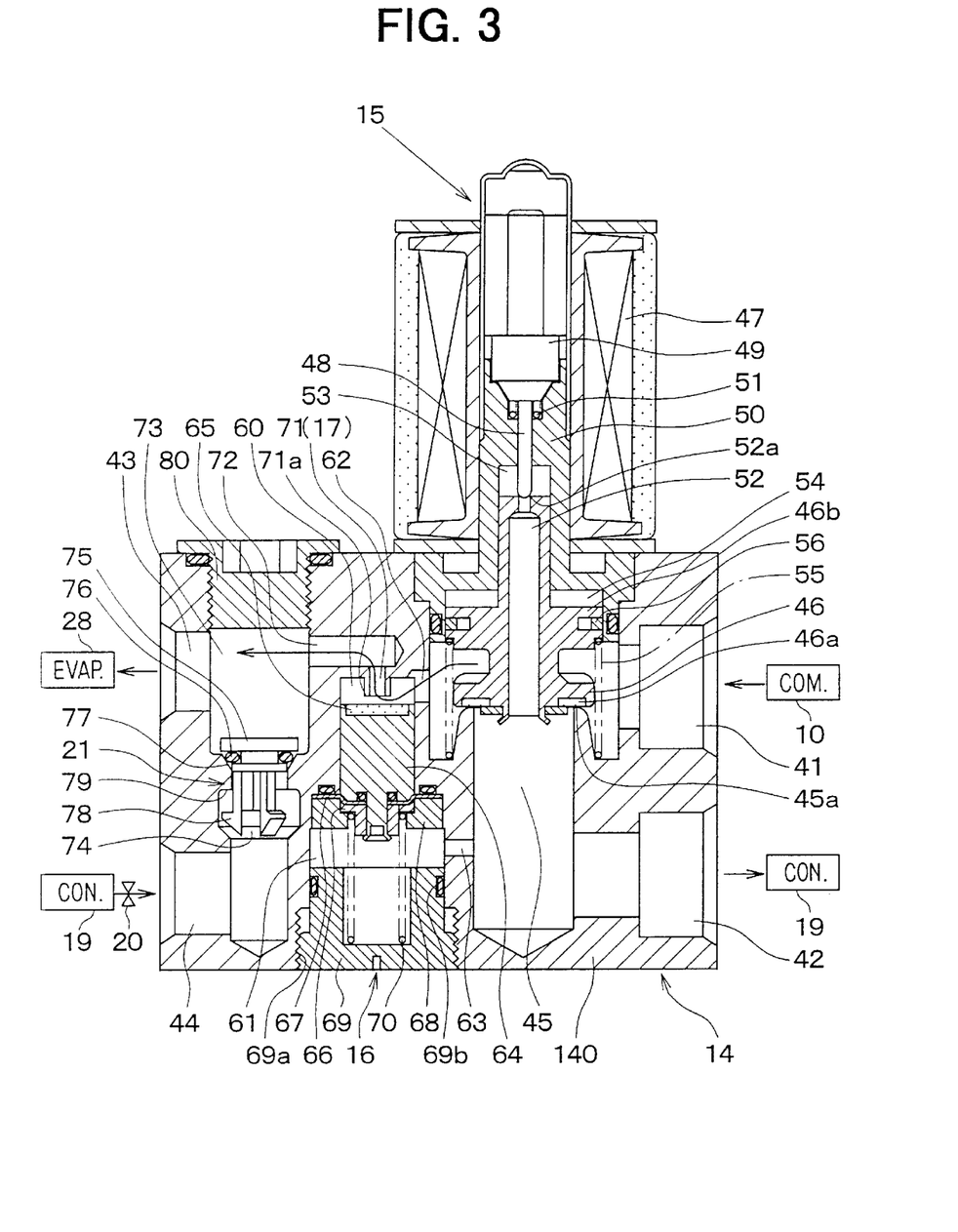
FIG. 3 is a longitudinal sectional view showing the valve device when the pilot-type solenoid valve is closed, according to the first embodiment.

The main valve body 46 includes a packing member 46a at a position facing a valve seat potion 45a of the refrigerant passage 45, and closes the refrigerant passage 45 by pressing the packing member 46a onto the valve seat portion 45a as shown in FIG. 3.

Figure 2:
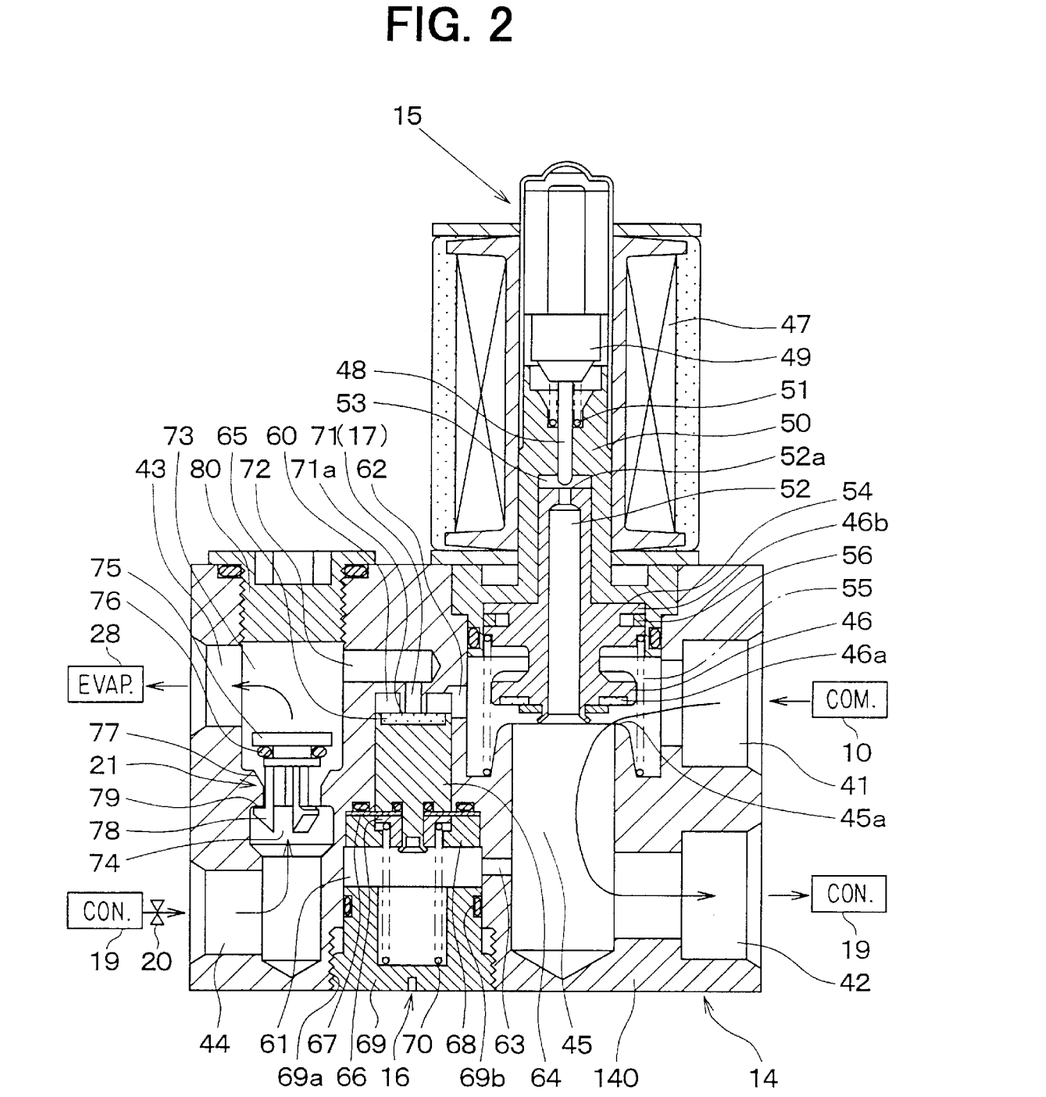
FIG. 2 is a longitudinal sectional view showing a valve device when a pilot-type solenoid valve is opened, according to the first embodiment.

As shown in FIG. 2, when the main valve body 46 is opened, the electrical power is not supplied to the electromagnetic coil 47, so that an electromagnetic attractive force is not generated between a magnetic plunger (movable magnetic member) 49 and a fixed magnetic-pole member 50. Therefore, the plunger 49 is moved upward in FIG. 1 by a spring force of a compression coil spring 51.

The supplementary valve body 48 having a needle shape is press-fitted to a center portion of the plunger 49, and moves upward together with the plunger 49. Thus, the supplementary valve body 48 opens a communication passage 52 provided at a center portion of the main valve body 46. Accordingly, a refrigerant pressure in the refrigerant passage 45 acts in back pressure chambers 53, 54 of the main valve body 46.

The back pressure chamber 53 is provided between an upper end surface of a small diameter portion of the main valve body 46 and a wall surface of the fixed magnetic-pole member 50. As shown in FIG. 3, the back pressure chamber 54 is provided between an upper end surface of a flange portion (large diameter portion) 46b of the main valve body 46 and a wall surface of the fixed magnetic-pole member 50. Both back pressure chambers 53, 54 communicate with each other through a clearance between the main valve body 46 and the fixed magnetic-pole member 50.

Further, a notch portion (not shown) is provided on a peripheral portion of a piston ring 56 in a circumferential direction. The piston ring 56 is held on an outer circumferential surface of the flange portion 46b of the main valve portion 46. Therefore, the back pressure chamber 54 always communicates with the first refrigerant passage 41 at an upstream refrigerant side through the notch portion of the piston ring 56. However, since a passage sectional area of the notch portion of the piston ring 56 is made to be smaller than that of the communication passage 52, a refrigerant pressure in the back pressure chamber 54 becomes a refrigerant pressure in the refrigerant passage 45 through the communication passage 52 and the back pressure chamber 53 as described above.

Since a refrigerant passage sectional area is restricted between the main valve body 46 and the valve seat portion 45a, a refrigerant pressure in the refrigerant passage 45 is smaller than a refrigerant pressure in the first refrigerant passage 41 at the upstream refrigerant side of the valve seat portion 45a. Therefore, a refrigerant pressure in the back pressure chamber 53, 54 is smaller than that in the first refrigerant passage 41 to have a pressure difference therebetween, and the main valve body 46 is moved upward as shown in FIG. 2 by this pressure difference and the spring force of the compression coil spring 55, thereby maintaining the open state of the main valve body 46.

As shown in FIG. 3, on the contrary, when the electrical power is supplied to the electromagnetic coil 47, the electromagnetic attractive force is generated between the plunger 49 and the fixed magnetic-pole member 50, so that the plunger 49 is moved to contact the fixed magnetic-pole member 50 against the spring force of the compression coil spring 51. Accordingly, the supplementary valve body 48 also moves downward together with the plunger 49 to contact the valve seat portion 52a, so that the communication passage 52 is closed.

In this case, the back pressure chamber 54 always communicates with the first refrigerant passage 41 at the upstream refrigerant side of the valve seat portion 45a through the notch portion of the piston ring 56. Therefore, when the communication passage 52 is closed, the refrigerant pressure in the back pressure chamber 54, and the refrigerant pressure in the back pressure chamber 53 are gradually increased to the refrigerant pressure in the first refrigerant passage 41.

Accordingly, when the refrigerant pressure in the back pressure chambers 53, 54 becomes larger than that in the refrigerant passage 45, the main valve body 46 moves downward by this pressure difference against the spring force of the compression coil spring 55, and presses the packing member 46a onto the valve seat portion 45a of the refrigerant passage 45 to seal around the valve seat portion 45a. When the main valve portion 46 moves downward, the supplementary valve body 48 also moves downward by the electromagnetic force of the electromagnetic coil 47, thereby maintaining the close state of the communication passage 52.

As described above, the communication passage 52 is opened and closed by the supplementary valve body 48, so that a refrigerant pressure in the back pressure chambers 53, 54 is switched between a low pressure state with the refrigerant pressure in the refrigerant passage 45 and a high pressure state with the refrigerant pressure in the first refrigerant passage 41. Therefore, the coil 47 is only need to drive the supplementary valve body 48 having a small pressure-reception area, but is not required to drive the main valve body 46 having a large pressure-reception area, thereby reducing the electromagnetic attractive force of the electromagnetic coil 47.

Further, the main valve body 46 is opened when non-electrical power is supplied to the electromagnetic coil 47, and the main valve body 46 is closed when the electrical power is supplied to the electromagnetic coil 47. Accordingly, if a trouble is occurred in an electric system of the solenoid valve 15, the open state of the solenoid valve 15 can be ensured, and a cooling function in summer can be obtained.

Next, the differential pressure valve 16 will be described. The differential pressure valve 16 is closed when the pilot-type electromagnetic valve 15 opens as shown in FIG. 2, and is opened when the pilot-type electromagnetic valve 15 closes as shown in FIG. 3. The differential pressure valve 16 is constructed as in the following manner.

That is, the differential pressure valve 16 includes a first chamber 60 at its upper side and a second chamber 61 at its lower side. The first chamber 60 communicates with the first refrigerant passage 41 through a communication hole 62 and a space around the main valve body 46 of the solenoid valve 15, so that the refrigerant pressure at the compressor discharge side is introduced into the first chamber 60. The second chamber 61 communicates with the second refrigerant passage 42 through a communication hole 63 and the refrigerant passage 45, so that the refrigerant pressure at the condenser side is introduced into the second chamber 61.

A pillar valve body 64 of the differential pressure valve 16 is disposed in the first chamber 60 slidably in an up-down direction. A packing member 65 is fixed to an upper surface (one end in an axial direction) of the valve body 64, and a center portion of a diaphragm 67 is air-tightly attached to a lower surface (the other end in the axial direction) of the valve body 64 through a metal contact member 66. A metal fixing member 68 having a cylindrical shape is press-fitted into the second chamber 61, so that a peripheral portion of the diaphragm 67 is airtightly attached to an upper wall surface of the second chamber 61. Accordingly, the first chamber 60 and the second chamber 61 are airtightly partitioned by the diaphragm 67 used as an elastic partition member.

A compression coil spring 70 is disposed between a lower surface of the contact member 66 and an adjustment screw member 69, and the valve body 64 is biased upward (in a valve closing direction) by a spring force of the compression coil spring 70. An attachment position of the adjustment screw member 69 can be adjusted by a male screw 69a relative to a wall surface of the second chamber 61, that is, relative to the housing member 140. The spring force of the compression coil spring 70 is adjusted by adjusting the attachment position of the adjustment screw member 69, thereby adjusting a valve opening pressure of the differential pressure valve 16. Further, the adjustment screw member 69 is airtightly fixed to the wall surface of the second chamber 61 by an O-ring 69b.

A restriction passage 71 (throttle passage) is provided to face the packing member 65 on the upper surface of the valve body 64, and is closed by pressing the packing member 65 to a valve seat portion 71a of the restriction passage 71 when the differential pressure valve 16 closes as shown in FIG. 2. The restriction passage 71 is a small-diameter passage having a diameter $\phi$ of about 2 mm, for example, and can be used as the heating decompression unit (fixed restrictor) 17 by making its passage sectional area small. Accordingly, the heating decompression unit 17 shown in FIG. 1 can be extremely readily formed in the housing member 140.

Next, a description will be made on an operation of the differential pressure valve 16. In the pilot-type solenoid valve 15, when the current is not supplied to the electromagnetic coil 47 and the main valve body 46 is opened as shown in FIG. 2, the refrigerant pressure at the discharge side of the compressor 10 is introduced into the first chamber 60 of the differential pressure valve 16 through the first refrigerant passage 41 and the communication hole 62. On the other hand, the refrigerant pressure in the refrigerant passage 45 at the downstream refrigerant side of the main valve body 46 is introduced into the second chamber 61 of the differential pressure valve 16 through the communication hole 63.

At this time, the refrigerant pressure in the refrigerant passage 45 is lower than that in the first refrigerant passage 41 by the throttle at the valve seat portion 45a. However, the spring force of the compression coil spring 70 is set so that a force due to the spring force in the valve closing direction of the valve body 64 is larger than a force due to this pressure difference in the valve opening direction of the valve body 64. Therefore, when the pilot-type solenoid valve 15 is opened, the valve body 64 of the differential pressure valve 16 is pressed to the valve seat portion 71a of the restriction passage 71 by the spring force of the compression coil spring 70, so that the differential pressure valve 16 is maintained at the closing state as shown in FIG. 2.

On the contrary, in the pilot-type electromagnetic valve 15, when the current is supplied to the electromagnetic coil 47 and the main valve body 46 is closed as shown in FIG. 3, the refrigerant pressure at the discharge side of the compressor 10 is introduced into the first chamber 60 of the differential pressure valve 16 through the first refrigerant passage 41 and the communication hole 62. In this case, the refrigerant passage 45 at the downstream refrigerant side of the main valve body 46 is interrupted from the high-pressure side of the refrigerant cycle system by the main valve body 46. Therefore, the refrigerant pressure in the refrigerant passage 45, that is, the refrigerant pressure in the second chamber 61 is reduced to a pressure greatly lower than the refrigerant pressure at the discharge side of the compressor 10.

As a result, the pressure difference between the first chamber 60 and the second chamber 61 of the differential pressure valve 16 becomes equal to or larger than a predetermined pressure (e.g., 0.49 MPa) set by the spring force of the compression spring coil 70. Therefore, the valve body 64 of the differential pressure valve 16 moves downward by this pressure difference to open the restriction passage 71, and the differential pressure valve 16 is opened as shown in FIG. 3.

Next, the construction of the valve device 14 at the outlet side of the restriction passage 71 will be now described. The outlet side of the restriction passage 71 communicates with an outlet chamber 73 and the third refrigerant passage 43 trough a communication hole 72. On the other hand, the fourth refrigerant passage 44 communicates with the outlet chamber 73 through a communication passage 74. In the communication passage 74, the check valve 21 for preventing refrigerant having passed through the restriction passage 71 from flowing into the fourth refrigerant passage 44 is provided.

The check valve 21 includes a valve body 75 molded by resin to have a substantially circular pillar shape, and an O-ring (elastic sealing member) 76 is attached to an outer circumferential surface of the valve body 75.

FIG. 2 shows a valve opening state of the check valve 21. As shown in FIG. 2, when a refrigerant pressure at an inlet side of the communication passage 74 (at the side of the fourth refrigerant passage 44) is larger than a refrigerant pressure at an outlet of the communication passage 74 (at the side of the outlet chamber 73), that is, when a pressure state is in a forward direction of the check valve 21, the valve body 75 moves upward from a valve closing position shown in FIG. 3 to separate the O-ring 76 from a valve seat portion 77 of the communication passage 74, so that the check valve 21 is opened as shown in FIG. 2.

An engagement claw portion 78 for setting a valve-opening lift amount at a predetermined amount is integrated with the valve body 75 by molding. Therefore, the engagement claw portion 78 is engaged with a stopper surface 79 of the communication passage 74, so that the check valve 21 is opened while being held at a predetermined position.

On the contrary, when the refrigerant pressure at the inlet side of the communication passage 74 is smaller than the refrigerant pressure at the outlet of the communication passage 74, that is, when a pressure state is in a backward direction of the check valve 21, the valve body 75 moves downward from the valve opening position shown in FIG. 2 so that the O-ring 76 presses to the valve seat portion 77 of the communication passage 74. In this case, the check valve 21 is closed as shown in FIG. 3. Further, a closing stopper 80 is disposed to seal a hole portion drilled at the time of drilling the communication passage 74 and the outlet chamber 73.

In the valve device 14 shown in FIGS. 2, 3, the hot-gas bypass passage 18 is constructed by a passage including the communication hole 62, the first chamber 60, the restriction passage 71 and the communication hole 72.

Next, operation of the refrigerant cycle system according to the first embodiment will be described. When the cooling mode is selected by the operation members 33c of the air-conditioning operation panel 33b, electrical power is supplied to the electromagnetic clutch 11, and the electromagnetic clutch 11 is turned on so that the compressor 10 is driven by the vehicle engine 12. When the cooling mode is selected, the electromagnetic coil 47 of the pilot-type electromagnetic valve 15 is controlled to be not energized by a control signal from the air-conditioning electronic control unit 33.

Accordingly, the supplementary valve body 48 opens the communication passage 52, and the main valve body 46 opens the refrigerant passage 45 as in FIG. 2, so that the solenoid valve 15 is opened. As a result, the pressure difference between the first chamber 60 and the second chamber 61 becomes smaller, and the valve body 64 of the differential pressure valve 21 is pressed to the valve seat portion 71a of the restriction passage 71 by the spring force of the compression coil spring 70, so that the differential pressure valve 16 is maintained at the valve closing state in FIG. 2.

In this case, gas refrigerant discharged from the compressor 10 passes through the refrigerant passage 45 from the first refrigerant passage 41 of the valve device 14, and flows outside the valve device 14 from the second refrigerant passage 42 into the condenser 19. In the condenser 19, refrigerant is cooled by outside air blown by the cooling fan 19a to be condensed.

The condensed refrigerant having passed through the condenser 19 is decompressed by the cooling decompression unit 20 to be gas-liquid two-phase refrigerant having a low temperature and a low pressure. Then, the low-pressure refrigerant again flows inside the valve device 14 from the fourth refrigerant passage 44. At this time, refrigerant pressure is applied to the check valve 21 in the communication passage 74 in the forward direction to open the check valve 21. Accordingly, the low-pressure refrigerant passes through the communication passage 74, and flows outside the valve device 14 from the third refrigerant passage 43. Thereafter, refrigerant from the third refrigerant passage 43 passes through the low-pressure pipe 22, and flows into the evaporator 28.

In the evaporator 28, the low-pressure refrigerant absorbs heat from air blown by the blower 27 to be evaporated. Air cooled in the evaporator 28 is blown into the passenger compartment 25 to cool the passenger compartment 25. Refrigerant from the evaporator 28 is separated in the accumulator 31 into gas refrigerant and liquid refrigerant due to a mass-density difference between gas refrigerant and liquid refrigerant within, and the separated gas refrigerant is sucked into the compressor 10. At the same time, a small amount of liquid refrigerant including lubricating oil, stored within the accumulator 31 at the lower side, is also sucked into the compressor 10.

In winter, when the heating mode using the hot gas heater of the refrigerant cycle system is selected, electrical power is supplied to the electromagnetic clutch 11 based on a control signal from the air-conditioning electronic control unit 33, and the compressor 10 is driven by the vehicle engine 12. At this time, electrical power is applied to the electromagnetic coil 47 of the pilot-type electromagnetic valve 15 according to a control signal of the air-conditioning electronic control unit 33.

Accordingly, the supplementary valve body 48 closes the communication passage 52, and the main valve body 46 closes the refrigerant passage 45 as shown in FIG. 3, so that the solenoid valve 15 is closed. As a result, the refrigerant pressure in the first chamber 60 becomes larger than that in the second chamber 61, and this pressure difference is rapidly increased. When this pressure difference between the first chamber 60 and the second chamber 61 is equal to or larger than a set pressure, the valve body 64 of the differential pressure valve 21 moves downward against the spring force of the compression coil spring 70 to be separated from the valve seat portion 71a of the restriction passage 71. Therefore, the restriction passage 71 is opened, and the differential pressure valve 16 is opened as shown in FIG. 3, so that the hot-gas bypass passage 18 is opened.

Thus, the gas refrigerant (super-heated gas refrigerant) discharged from the compressor 10 passes through the restriction passage 71 via the first refrigerant passage 41, the communication hole 62 and the first chamber 60 of the valve device 14. Since the restriction passage 71 can be used as a fixed restrictor for forming the heating decompression unit 17, the gas refrigerant discharged from the compressor 10 is decompressed to a predetermined pressure in the restriction passage 71.

Thereafter, the decompressed gas refrigerant passes through the communication hole 72 and the outlet chamber 73, flows outside the valve device 14, and passes through the low-pressure pipe 22 to flow into the evaporator 28. In the evaporator 28, the high-temperature gas refrigerant radiates heat to air blown by the blower 27 to heat air. The gas refrigerant having being cooled in the evaporator 28 passes through the accumulator 31, and is sucked into the compressor 10 to be again compressed.

Because the refrigerant pressure in the outlet chamber 73 is larger than that in the fourth refrigerant passage 44 in the heating mode, the check valve 21 is closed. Therefore, it can prevent the high-temperature refrigerant from returning to the side of the condenser 19 and from being stored within the condenser 19 (refrigerant-storing phenomenon).

According to the first embodiment of the present invention, at least the solenoid valve 15, the differential pressure valve 16 and the check valve 21 are integrated by the housing member 140 to construct an integrated structure of the valve device 14. Therefore, an arrangement space of the valve device 14 and the number of attachment steps thereof can be reduced. Further, the refrigerant cycle system operates by a combination of the one solenoid valve 15 and the one differential pressure valve 16. Since the differential pressure valve 16 can be made smaller, lighter and simpler than the solenoid valve 15 in addition to the integration of the three valves 15, 16, 21, the valve device 14 can be produced in low cost.

Furthermore, because the differential pressure valve 16 is opened by the pressure difference between the discharge side of the compressor 10 and an inlet side of the condenser 19, generated when the solenoid valve 15 is closed, both the solenoid valve 15 and the differential pressure valve 16 are not closed at the same time. Therefore, it can prevent a refrigerant cycle circuit of the refrigerant cycle system from being closed when the compressor 10 operates, and it can prevent the refrigerant cycle circuit from failing.

In the first embodiment of the present invention, the hot-gas bypass passage 18 is constructed within the housing member 140 of the valve device 14, and the restriction passage 71 constructing the heating decompression unit 17 is also provided in the housing member 140 of the valve device 14. Accordingly, the refrigerant cycle system can be made compact, while the valve device 14 has a simple structure.

A second preferred embodiment of the present invention will be now described with reference to FIGS. 5–11. In the second embodiment, a shape of the check valve 21 described in the first embodiment is simplified, and a flowing noise of refrigerant discharged from the restriction passage (fixed restrictor) 71 constructing the heating decompression unit 17 is reduced.

Figure 4:
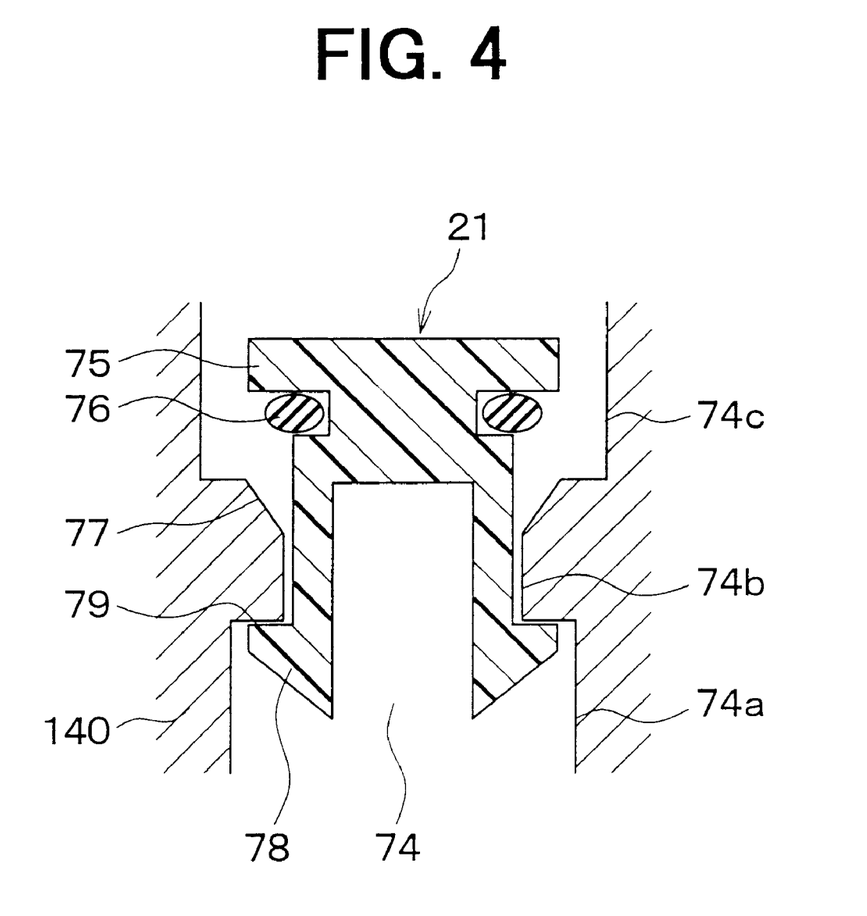
FIG. 4 is an enlarged sectional view showing a check valve of the valve device according to the first embodiment.

In the above-described first embodiment, as shown in FIG. 4, the engagement claw portion 78 for regulating the valve-opening lift amount at the predetermined amount is integrated with the resin valve body 75 of the check valve 21 by molding. Therefore, the engagement claw portion 78 is engaged onto the stopper surface 79 of the communication passage 74, so that the check valve 21 is opened while being held at the predetermined position. Accordingly, the valve body 75 of the check valve 21 has a complicated shape including the engagement claw portion 78. On the other hand, in the housing member 140, an opening shape of the communication passage 74 is required to have three hole diameters 74a, 74b and 74c concentrically provided in a three-step shape as shown in FIG. 4, thereby increasing drilling cost of the communication passage 74.

As described above, the closing stopper 80, for sealing the hole portion drilled at the time of drilling the communication passage 74 and the outlet chamber 73, is located at the rear side of the check valve 21 in its valve-opening direction. Accordingly, in the second embodiment, in consideration of this viewpoint, a pin member 81 is integrated with the closing stopper 80 by molding, and is used as a position regulating member for setting an opening position of the valve body 75 of the check valve 21 at a predetermined position as shown in FIGS. 5–8, thereby simplifying the valve body shape of the check valve 21.

Figure 7:
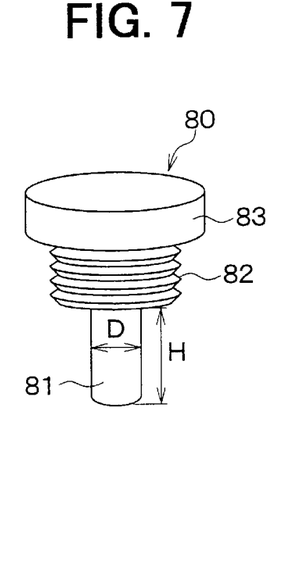
FIG. 7 is an enlarged perspective view showing an example of a closing stopper of the valve device according to the second embodiment.

As shown in FIG. 7, the closing stopper 80 is formed by integrally molding the pillar pin member 81, a male screw portion 82 and the base portion 83. Although the closing stopper 80 is normally formed by resin molding, it may be formed by machining (cutting) of a metal such as aluminum.

Figure 6:
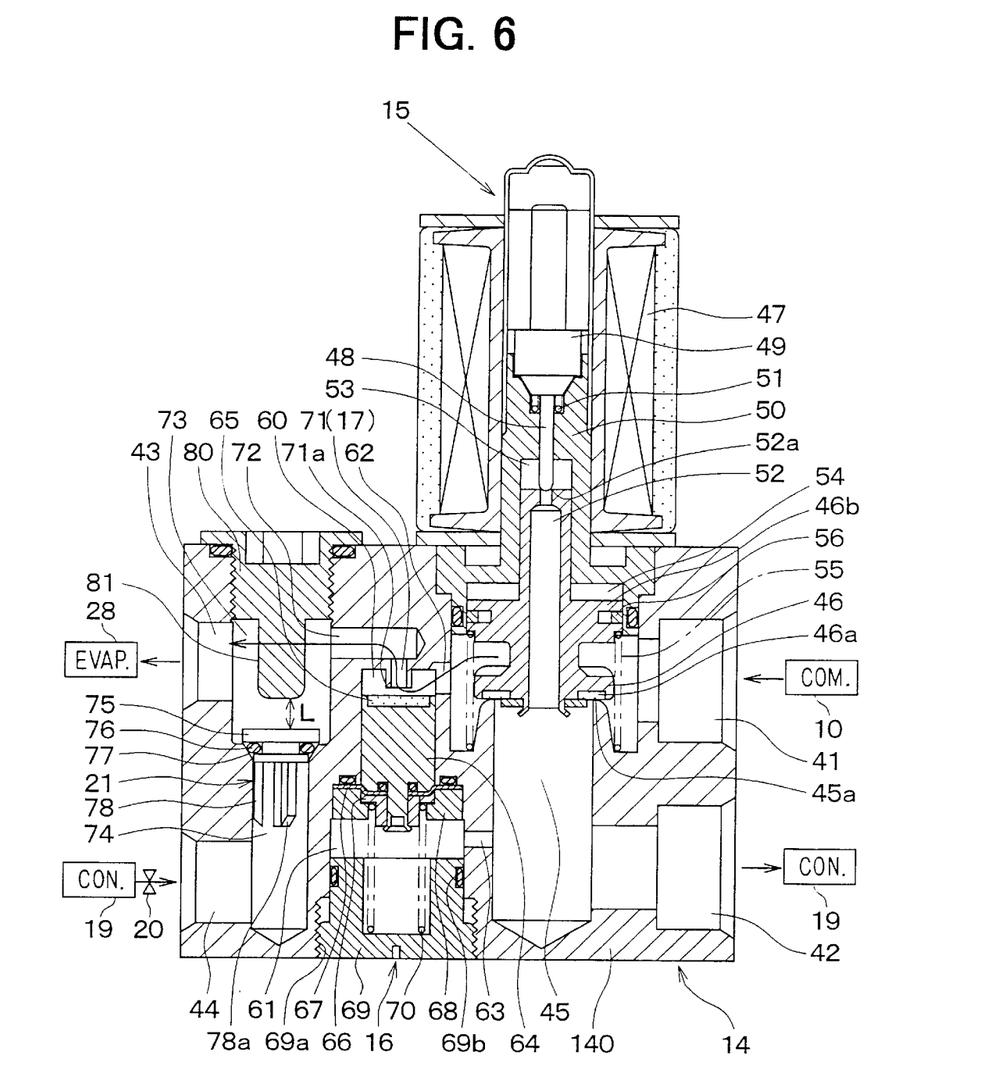
FIG. 6 is a longitudinal sectional view showing the valve device when the pilot-type solenoid valve is closed, according to the second embodiment.

FIG. 6 shows a valve-closing state of the check valve 21. As shown in FIG. 6, the pin member 81 of the closing stopper 80 extends in the outlet chamber 73 at a center portion of its hole diameter coaxially with respect to the center portion. Further, a height (axial length) H of the pin member 81 in FIG. 7 is set so that a predetermined clearance L is provided between the pin member 81 and the valve body 75 of the check valve 21 when the check valve 21 is closed.

In the second embodiment, the pin member 81 of the closing stopper 80 is constructed to be also used as a collision member with which refrigerant decompressed by the restriction passage 71 and discharged into the outlet chamber (passage space) 73 from the communication hole 72 collides. Therefore, the pin member 81 is disposed in the outlet chamber 73 at the center portion of its hole diameter, so that a center axis of the pin member 81 and a center axis of the circular communication hole 72 cross each other, and the pin member 81 is disposed to be faced to an opening of the communication hole 72.

Here, a diameter D of the pin member 81 is set to be equal to or larger than a diameter of the circular communication hole 72. For example, the diameter of the communication hole 72 is about 3 mm, and the diameter D of the pin member 81 is about 3–7 mm. Accordingly, a surface area of the pin member 81 facing the opening of the circular communication hole 72 can be made equal to or larger than the opening area of the communication hole 72. Here, the hole diameter of the outlet chamber 73, into which the pin member is inserted, is about 10 mm.

Figure 5:
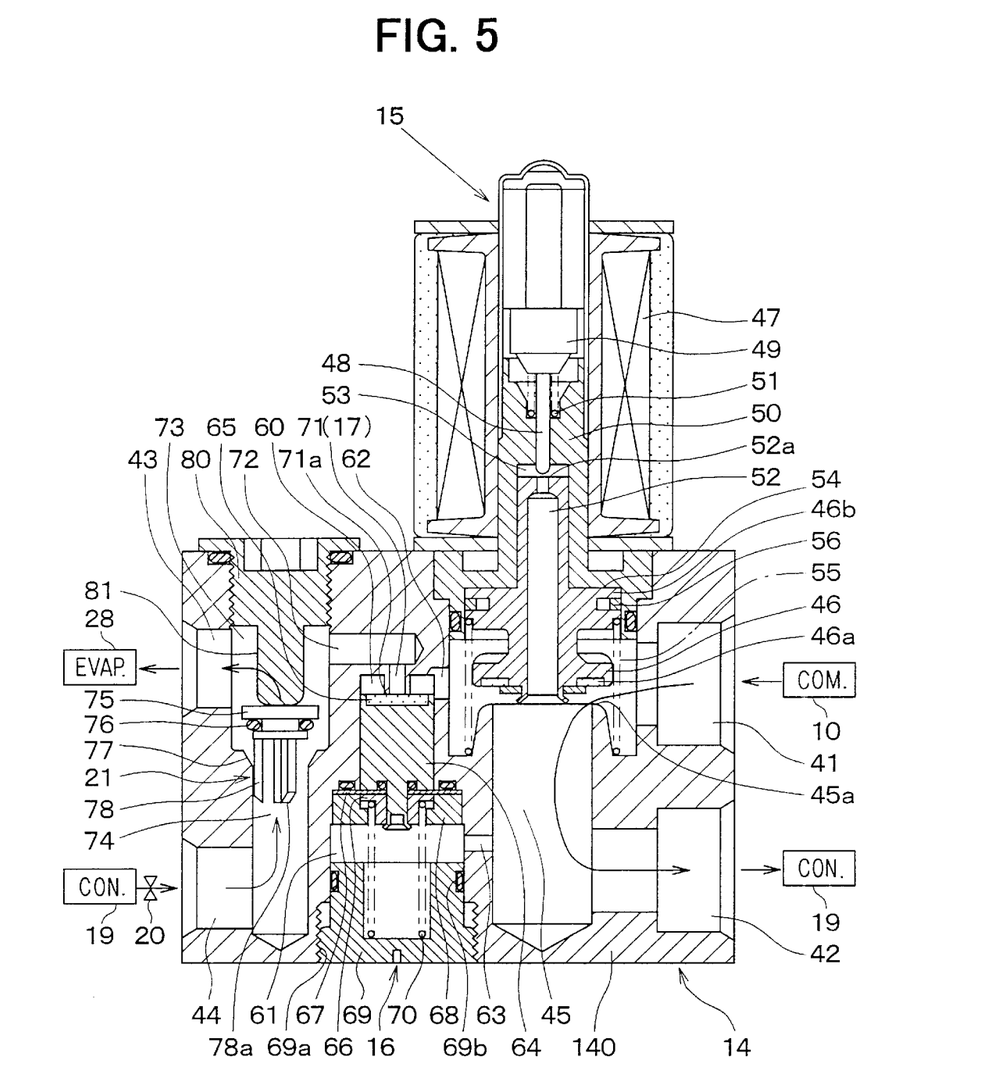
FIG. 5 is a longitudinal sectional view showing a valve device when a pilot-type solenoid valve is opened, according to a second preferred embodiment of the present invention.
Figure 8:
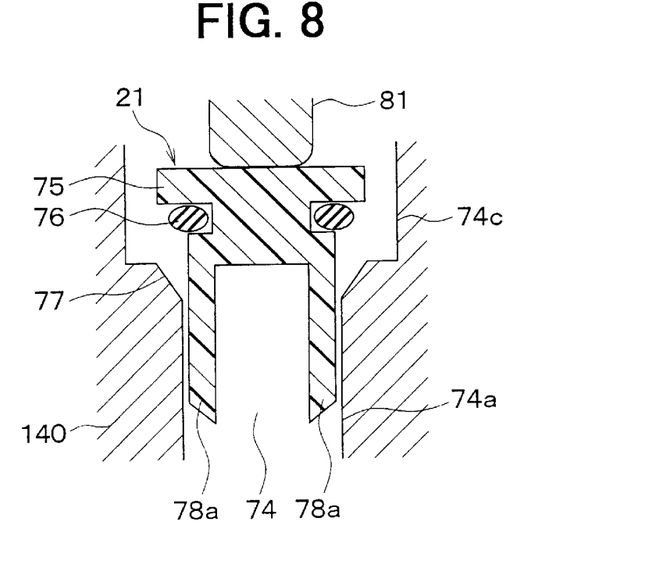
FIG. 8 is an enlarged sectional view showing a regulating operation using a pin member of the closing stopper, for setting a valve opening position of the check valve, according to the second embodiment.

FIGS. 5 and 8 shows a valve opening state of the check valve 21. As shown in FIGS. 5, 8, when the check valve 21 is opened, the valve body 75 of the check valve 21 contacts a tip portion of the pin member 81, so that the valve opening position of the valve body 75 can be set at a predetermined position. Therefore, the engagement claw portion 78 described in the first embodiment is not required to be provided on the valve body 75. Further, the stopper surface 79 described in the first embodiment, on which the engagement claw portion 78 is engaged, is also not required to be provided at the side of the communication passage 74.

Accordingly, in the second embodiment, the valve body 75 can be provided with only a simple guide member 78a extending linearly in place of the engagement claw portion 78. Since a claw-shaped member protruding outward radially is not provided on the body valve 75, the valve body shape of the check valve 21 can be simplified, and molding cost of the valve body 75 can be reduced.

Similarly, as shown in FIG. 8, the hole shape of the communication passage 74 can be made simple to have two hole diameters 74a, 74c concentrically provided in a two-step shape. Therefore, the hole shape of the communication passage 74 is not required to be complicated, thereby simplifying the hole shape of the communication passage 74 and reducing machining cost for forming the hole shape of the communication passage 74.

Furthermore, according to the second embodiment, refrigerant-flowing noise in the heating mode can be effectively reduced by the following reason.

That is, when the differential pressure valve 16 is opened in the heating mode, high-pressure (e.g., 1.96 MPa) gas refrigerant is rapidly reduced to a low pressure by the restriction passage 71 constructing the heating decompression unit 17, and the decompressed gas refrigerant passes through the communication hole 72 to flow toward the outlet chamber 73. In the first embodiment, since a refrigerant passage sectional area is rapidly enlarged from the communication hole 72 to the outlet chamber 73, the decompressed gas refrigerant having passed through the communication hole 72 is jetted into the outlet chamber 73. The jet gas flow into the outlet chamber 73 is in a sound-velocity state, and is generally called jet core. A mixture region including an abrupt velocity gradient is formed at a peripheral side of the jet gas flow, and the refrigerant-passing noise (refrigerant-flowing noise) occurs due to this abrupt velocity gradient.

In the second embodiment, because the pin member 81 is located within the outlet chamber 73, a refrigerant passage sectional area of the outlet chamber 73 is substantially reduced. Therefore, the refrigerant passage sectional area is restricted from being rapidly enlarged from the communication hole 72 to the outlet chamber 73, thereby restricting a velocity of the jet gas flow from being increased. Further, the pin member 81 is disposed at a downstream refrigerant side of the communication hole 72, and the surface area of the pin member 81 facing the communication hole 72 is equal to or larger than the opening area of the communication hole 72. Therefore, even if the jet gas flow is generated, the gas flow, immediately after being jetted, collides with the pin member 81. As a result, the refrigerant-passing noise due to the rapid decompression in the restriction passage 71 constructing the heating decompression unit 17 can be effectively reduced.

Figure 9A:
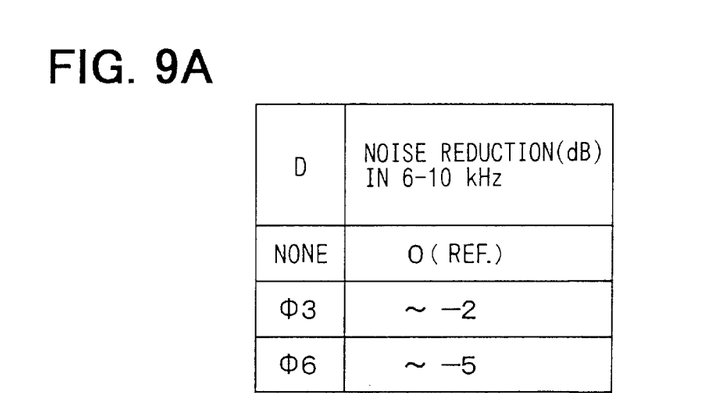
FIG. 9A is a view for explaining a reducing effect of a refrigerant-passing noise due to the pin member of the closing stopper.
Figure 9B:
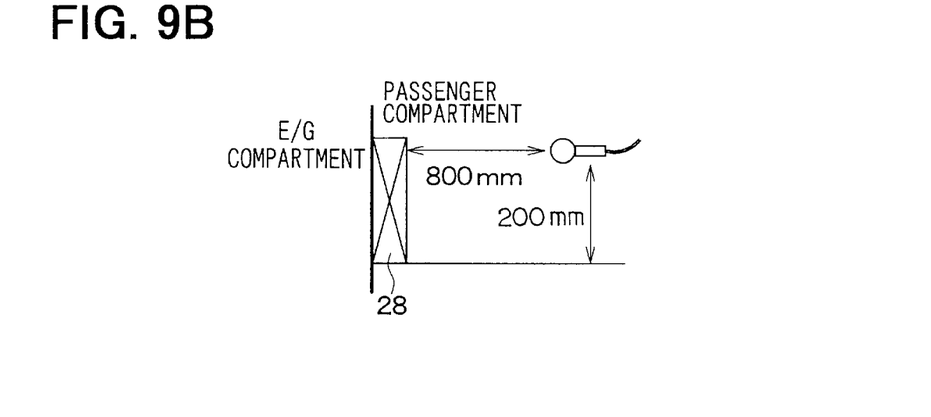
FIG. 9B is a schematic diagram for explaining a detection method of the refrigerant-passing noise, according to the second embodiment.

FIG. 9A is test data showing the refrigerant-passing noise when the diameter D of the pin member 81 is changed in the heating mode. This refrigerant-passing noise is detected by setting a microphone around a front seat position in the passenger compartment, that is, at a position separated from the evaporator 28 by 800 mm toward a passenger seat and separated from a bottom end of the evaporator 28 by 200 mm upwardly as shown in FIG. 9B.

In the heating mode, that is, in hot-gas heater operation, the refrigerant cycle system is in a stationary operation condition where refrigerant pressure discharged from the compressor 10 is equal to 1.96 mega-pascal (MPa). Further, in FIGS. 9A and 9B, a hole diameter of the restriction passage 71 constructing the heating decompression unit 17 is equal to 2 mm, a hole diameter of the communication hole 72 is equal to 3 mm, and a hole diameter of the outlet chamber 73 is equal to 10 mm. In these conditions, the refrigerant-passing noise is detected in the above-described method while the diameter D of the pin member 81 of the closing stopper 80 is changed.

According to the tests performed by the present inventors, the refrigerant passage noise can be effectively reduced by the pin member 81 in a high frequency region (in a range of 6–10 KHz) as shown in FIG. 9A. In FIG. 9A, a sound-pressure reduction amount (dB) is shown as a noise-reduction effect with respective to a case that the radial dimension D of the pin member 81 is zero, that is, the pin member 81 is not provided. Specifically, the noise reduction of 2 dB can be obtained when the radial dimension D is equal to 3 mm, and the noise reduction of 5 dB can be obtained when the radial dimension D is equal to 6 mm.

Figure 10:
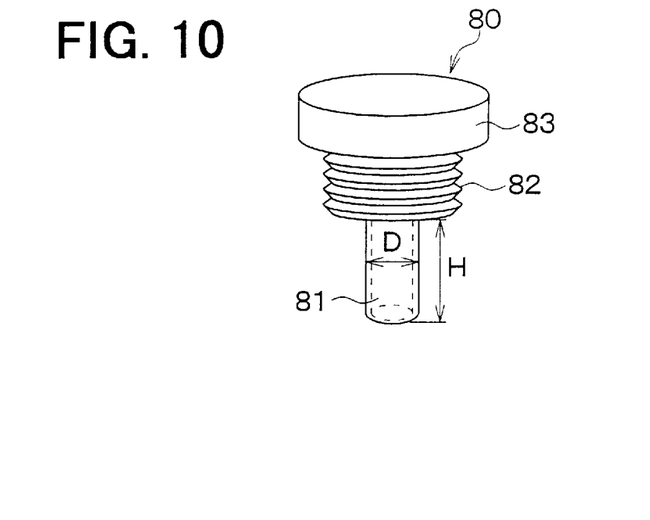
FIG. 10 is an enlarged perspective view showing an another example of a closing stopper of the valve device, according to the second embodiment.
Figure 11A:
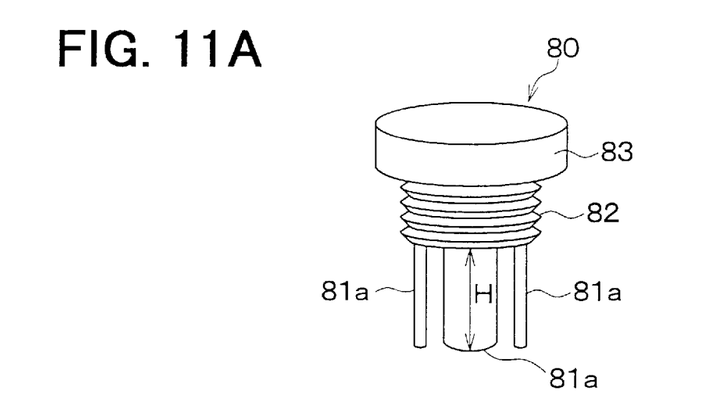
FIG. 11A and FIG. 11B are an enlarged perspective view and a bottom view, respectively, showing a further another example of a closing stopper of the valve device, according to the second embodiment.
Figure 11B:
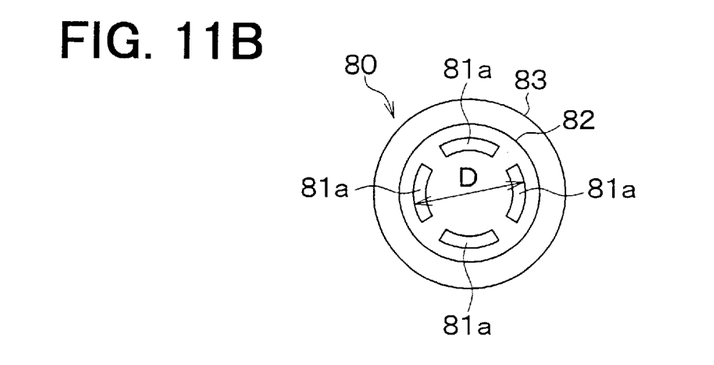

In the second embodiment, the pin member 81 can be formed into a hollow cylindrical shape shown in FIG. 10 without limited to the solid pillar shape shown in FIG. 7. Further, as shown in FIGS. 11A, 11B, plural separated plate members 81a can be provided in place of the pin member 81. Each plate member 81a is formed into a plate shape having an arc cross-section and a predetermined height H, and the plural plate members 81a are arranged in a ring shape. Here, a radial dimension D of this ring-shape arrangement of the plate members 81a can be set similarly to the radial dimension D of the pin member 81, so that the plural plate members 81a can have the same function as the pin member 81.

Although the present invention has been fully described in connection with the preferred embodiments thereof with reference to the accompanying drawings, it is to be noted that various changes and modifications will become apparent to those skilled in the art.

For example, in the above-described first and second embodiments, the cooling decompression unit 20 is constructed separately from the valve device 14. However, the cooling decompression unit 20, constructed by a fixed restrictor having a short refrigerant passage such as an orifice and a nozzle, can be integrally constructed within the housing member 140 of the valve device 14. That is, a fixed restrictor constructing the cooling decompression unit 20 can be provided around the fourth refrigerant passage 44 within the housing member 140.

Such changes and modifications are to be understood as being within the scope of the present invention as defined by the appended claims.

What is claimed is:

1. A valve device for a refrigerant cycle system which switches an operation mode between a cooling mode where air is cooled by evaporating low-pressure refrigerant in an evaporator and a heating mode where air is heated in the evaporator by using gas refrigerant directly introduced from a compressor, the valve device comprising:

a solenoid valve for opening and closing a refrigerant passage between a discharge side of the compressor and a condenser cooling and condensing refrigerant in the cooling mode;

a differential pressure valve disposed to be opened by a pressure difference between the discharge side of the compressor and the condenser, generated when the solenoid valve is closed, in such a manner that gas refrigerant discharged from the compressor is directly introduced into the evaporator when the differential pressure valve is opened;

a check valve disposed to prevent refrigerant at the discharge side of the compressor from flowing into the condenser when the differential pressure valve is opened; and a housing member for defining a refrigerant passage, by which the solenoid valve, the differential pressure valve and the check valve are integrated to construct an integrated structure.

2. The valve device according to claim 1, wherein:

the housing member is disposed to define a first refrigerant passage connected to the discharge side of the compressor, a second refrigerant passage connected to a refrigerant inlet side of the condenser, a third refrigerant passage connected to a refrigerant inlet side of the evaporator, and a fourth refrigerant passage connected to a refrigerant outlet side of the condenser;

the solenoid valve is disposed to open and close a communication between the first and second refrigerant passages;

the differential pressure valve is disposed to open and close a communication between the first and third refrigerant passages;

the housing member is disposed to have therein heating decompression means for decompressing gas refrigerant flowing from the first refrigerant passage to the third refrigerant passage when the differential pressure valve is opened, and to have therein a communication passage through which the fourth refrigerant passage communicates with a downstream refrigerant side of the heating decompression means; and the check valve is provided in the communication passage.

3. The valve device according to claim 2, wherein:

the housing member is disposed to further have therein cooling decompression means for decompressing refrigerant flowing from the refrigerant outlet side of the condenser when the solenoid valve is opened; and the solenoid valve, the differential pressure valve, the check valve, the heating decompression means and the cooling decompression means are integrated through the housing member to construct an integrated structure.

4. The valve device according to claim 2, wherein the heating decompression means is a fixed throttle passage provided to be opened and closed by a valve body of the differential pressure valve.

5. The valve device according to claim 2, further comprising a closing stopper for sealing at least the communication passage, provided at a rear side of the check valve in a valve-opening direction of the check valve; and a position regulating member for regulating an opening position of the check valve at a predetermined position, the position regulating member being integrally formed with the closing stopper.

6. The valve device according to claim 5, wherein:

the housing member is disposed to further define a passage space through which a downstream refrigerant side of the heating decompression means and a downstream refrigerant side of the communication passage communicate with the third refrigerant passage; and the position regulating member is disposed in the passage space so that gas refrigerant, decompressed in the heating decompression means, collides with the position regulating member when the gas refrigerant from the heating decompression means is jetted into the passage space.

7. The valve device according to claim 6, wherein:

the position regulating member is disposed opposite an opening from which gas refrigerant, decompressed in the heating decompression means, is jetted into the passage space;

the position regulating member has a surface area facing the opening; and the surface area is equal to or larger than an opening area of the opening.

8. The valve device according to claim 5, wherein the position determination member is a pin member integrated with the closing stopper.

9. The valve device according to claim 5, wherein the position determination member is a plate member integrated with the closing stopper.

10. The valve device according to claim 2, wherein:

the housing member is disposed to further define a passage space through which a downstream refrigerant side of the heating decompression means and a downstream refrigerant side of the communication passage communicate with the third refrigerant passage, the valve device further comprising:

a collision member disposed in the passage space to collide with a flow of gas refrigerant, decompressed in the heating decompression means, when the gas refrigerant from the heating decompression means is jetted into the passage space.

11. The valve device according to claim 1, further comprising:

a heating decompression unit for decompressing refrigerant discharged from the compressor, before flowing into the evaporator, in the heating mode, wherein the heating decompression unit is disposed within the housing member to be integrated with the solenoid valve, the differential pressure valve and the check valve.

12. The valve device according to claim 11, further comprising:

a cooling decompression unit for decompressing refrigerant discharged from the condenser, before flowing into the evaporator, in the cooling mode, wherein the cooling decompression unit is disposed within the housing member to be integrated with the solenoid valve, the differential pressure valve, the check valve and the heating decompression unit.

13. The valve device according to claim 1, wherein:

the solenoid valve is a pilot-type solenoid valve including a main valve body for opening and closing the refrigerant passage between the discharge side of the compressor and the condenser, and a supplementary valve body which is disposed to be driven by an electromagnetic force of an electromagnetic coil, and to change a pressure applied to the main valve body.

14. The valve device according to claim 13, wherein the supplementary valve body is disposed, in such a manner that the main valve body is opened when non-electrical power is supplied to the electromagnetic coil, and is closed when electrical power is supplied to the electromagnetic coil.

15. A refrigerant cycle system comprising:

a compressor for compressing and discharging refrigerant;

a condenser for cooling and condensing gas refrigerant discharged from the compressor;

a cooling decompression unit for decompressing refrigerant from the condenser;

an evaporator for evaporating refrigerant from the cooling decompression unit;

means for forming a hot-gas bypass passage through which gas refrigerant discharged from the compressor is directly introduced into an inlet side of the evaporator while bypassing the condenser;

a heating decompression unit disposed in the hot-gas bypass passage, for decompressing gas refrigerant discharged from the compressor;

a solenoid valve for opening and closing a refrigerant passage between a discharge side of the compressor and an inlet side of the condenser;

a differential pressure valve disposed to be opened by a pressure difference between the discharge side of the compressor and the inlet side of the condenser, generated when the solenoid valve is closed, in such a manner that gas refrigerant discharged from the compressor is directly introduced into the evaporator through the hot-gas bypass passage when the differential pressure valve is opened;

a check valve disposed to prevent gas refrigerant, discharged from the compressor, from flowing into the condenser through the hot-gas bypass passage when the differential pressure valve is opened; and a housing member for defining a refrigerant passage, by which the solenoid valve, the differential pressure valve, the check valve, the hot gas bypass passage and the heating decompression unit are integrated to construct an integrated structure.

16. The refrigerant cycle system according to claim 15, wherein the cooling decompression unit is integrated with the integrated structure within the housing member.

* * * * *